(12) United States Patent
Prust et al.

(10) Patent No.: US 7,347,807 B2
(45) Date of Patent: Mar. 25, 2008

(54) MACHINE TOOL AND METHOD FOR CHANGING TOOLS ON THIS MACHINE TOOL

(75) Inventors: Dirk Prust, Tuttlingen (DE); Hans-Henning Winkler, Tuttlingen (DE)

(73) Assignee: CHIRON-WERKE GmbH & Co. KG, Tuttlingen (DE)

( * ) Notice: Subject to any disclaimer, the term of this patent is extended or adjusted under 35 U.S.C. 154(b) by 0 days.

(21) Appl. No.: 11/639,183

(22) Filed: Dec. 14, 2006

(65) Prior Publication Data

US 2007/0167302 A1 Jul. 19, 2007

Related U.S. Application Data

(63) Continuation of application No. PCT/EP2005/006363, filed on Jun. 14, 2005.

(30) Foreign Application Priority Data

Jun. 14, 2004 (DE) ........................ 10 2004 029 043

(51) Int. Cl.
  *B23Q 3/157* (2006.01)
  *B23C 5/26* (2006.01)
(52) U.S. Cl. ................ 483/43; 483/31; 409/233; 279/2.11; 279/137; 279/900
(58) Field of Classification Search ............. 409/233, 409/232, 231; 408/239 R, 240, 239 A; 483/43, 38, 36, 31, 30; 279/2.11, 2.12, 900, 279/137
See application file for complete search history.

(56) References Cited

U.S. PATENT DOCUMENTS 5,409,322 A * 4/1995 Horikawa et al. .......... 409/233

6,287,059 B1 * 9/2001 Hashidate et al. .......... 409/233
6,419,430 B2 * 7/2002 Hangleiter .................. 409/233
6,436,021 B2 * 8/2002 Nukui ........................ 409/233

(Continued)

FOREIGN PATENT DOCUMENTS

DE   41 17 701 A1   12/1992

(Continued)

*Primary Examiner*—Erica Cadugan
(74) *Attorney, Agent, or Firm*—Harness Dickey & Pierce, P.L.C.

(57) ABSTRACT

In the case of a machine tool which comprises at least one working spindle with a tool-holding fixture for tool holders carrying tools, and a tool changer with a gripper for the tool holders in order to transfer the tool holders between their magazine position, which is spaced apart from the tool-holding fixture, and their working position in the tool-holding fixture, a clamping system with a clamping apparatus by means of which a tool holder inserted into the tool-holding fixture is fixed is arranged in the working spindle, the clamping system additionally comprising a retaining apparatus for a tool holder situated in the tool-holding fixture. In the case of a method carried out on this machine tool, the clamping system carries out a retaining operation which temporally precedes the clamping operation in order to grasp the tool holder inserted into the tool-holding fixture before the clamping apparatus fixes the tool holder. Furthermore, an unblocking operation which temporally follows the release operation is carried out in order, after the release of the clamping apparatus, still to retain the tool holder in the tool-holding fixture until it is ejected.

12 Claims, 6 Drawing Sheets

U.S. PATENT DOCUMENTS

| | | |
|---|---|---|
| 6,923,605 B2 | 8/2005 | Jakob et al. |
| 7,165,921 B2 * | 1/2007 | Hangleiter ............... 409/233 |
| 7,195,431 B2 * | 3/2007 | Greif et al. ............... 409/233 |
| 2001/0006280 A1 | 7/2001 | Hangleiter |
| 2002/0006853 A1 * | 1/2002 | Susnjara .................. 483/47 |
| 2002/0014141 A1 | 2/2002 | Prust et al. |

FOREIGN PATENT DOCUMENTS

| | | |
|---|---|---|
| DE | 299 22 642 U1 | 3/2000 |
| DE | 100 31 027 A1 | 1/2002 |
| DE | 101 59 611 C1 | 5/2003 |
| DE | 104 55 333 A1 | 5/2003 |
| DE | 102 25 143 A1 | 1/2004 |
| EP | 0 517 085 A1 | 12/1992 |
| EP | 901859 A1 * | 3/1999 |
| JP | 63-105854 | 5/1988 |
| WO | WO 03/047795 A1 | 6/2003 |

* cited by examiner

MACHINE TOOL AND METHOD FOR CHANGING TOOLS ON THIS MACHINE TOOL

RELATED APPLICATION

This is a continuation application of International Patent Application PCT/EP2005/006363, filed Jun. 14, 2005, designating the United States and published in Germany as WO 2005/120769 A1, which claims priority to German Patent Application number 10 2004 029 043.1 filed Jun. 14, 2004.

BACKGROUND OF THE INVENTION

1. Field of the Invention

The present invention relates to a machine tool which comprises at least one working spindle with a tool-holding fixture for tool holders carrying tools, and a tool changer with a gripper for the tool holders in order to transfer the tool holders between their magazine position, which is spaced apart from the tool-holding fixture, and their working position in the tool-holding fixture, there being arranged in the working spindle a clamping system with a clamping apparatus, by means of which clamping apparatus a tool holder inserted into the tool-holding fixture is fixed.

The invention furthermore relates to a method for changing tools on a machine tool that comprises at least one working spindle with a tool-holding fixture for tool holders carrying the tools, and a tool changer with a gripper for the tool holders in order to transfer the tool holders between their magazine position, which is spaced apart from the tool-holding fixture, and their operating position in the tool-holding fixture, a clamping system being arranged in the working spindle, which clamping system fixes a tool holder, which is inserted into the tool-holding fixture, by means of a clamping operation and releases it by means of a release operation, wherein
  a) a tool holder which is in its magazine position is inserted into the tool-holding fixture by movement of the gripper,
  b) the clamping system grasps the tool holder at its upper end inserted into the tool-holding fixture and fixes it in the tool-holding fixture by means of the clamping operation, the tool holder being released from the gripper and the working spindle being brought up to its operating speed, and
  c) in order to remove the tool the working spindle is braked, the clamping system carries out the release operation, and the tool holder is ejected into the gripper which then transfers the tool holder into its magazine position.

2. Related Prior Art

Numerous machine tools of this type and methods for changing tools are known from the prior art.

DE 41 17 701 A1 describes a machine tool, in which a multiplicity of tool changers are distributed around the working spindle and each bear a gripper into which a tool holder carrying a tool is inserted. In this manner, there are as many tools in their magazine position, which is spaced apart from the tool-holding fixture in the working spindle, as there are tool changers.

In order to insert a tool into the tool-holding fixture, the tool changer is extended, in which case, on account of the parallelogram guidance, the gripper with the tool holder comes to rest under the working spindle. The tool changer is then moved upwards in the axial direction via a sleeve carrying all of the tool changers, as a result of which the tool holder is inserted into the tool-holding fixture. A clamping system is provided in the working spindle and now grasps the tool holder and fixes it in the tool-holding fixture.

After the tool holder is connected in a rotationally fixed manner to the working spindle, the latter is brought up to its operating speed. In this case, the gripper remains at the tool holder, with corresponding measures being provided so that the tool holder comes free from the gripper during operation.

If a new tool is to be inserted, the working spindle is braked until it reaches a coupling speed at which the clamping system is released and the tool holder is ejected from the tool-holding fixture and is again picked up by the gripper. The gripper then pivots the tool holder back into its magazine position while, in a push-pull operation, another tool holder is inserted by the corresponding tool changer into the tool-holding fixture and is fixed there with the aid of the clamping system.

DE 102 25 143 A1 discloses a machine tool which has two tool changers which, in a push-pull operation, interchange tools between a machine-tool magazine and the tool-holding fixture in the working spindle. The machine-tool magazine is arranged in a positionally fixed manner while the two tool changers are arranged on the spindle head carrying the working spindle. The spindle head moves into a changing position where the one tool changer removes the previously used tool from the tool-holding fixture while the other tool changer has already removed a tool which is to be inserted from the tool magazine where the tools are stored in their magazine position.

In the case of this machine tool, the gripper does not remain at the tool during use. If a tool is to be removed, the working spindle is first of all braked until it comes to a standstill before the gripper can grasp the tool which is thereupon ejected so that it can be placed in the tool magazine.

In the case of the method described last and the machine tool described last it is disadvantageous that the working spindle always first has to be braked to a standstill before the release operation for the clamped-in tool can begin. This is because there is the risk, when the clamping system is released, of the tool holder falling out of the tool-holding fixture, for which reason the clamping system is only released when the gripper has again grasped the tool. However, these method steps are time-intensive, which prolongs the time which is required for removing a tool.

Also during the clamping-in operation, with the moving away of the gripper a period of time has to be waited here until the clamping system has securely clamped in the tool holder, which likewise costs time.

Overall, the tool-changing time in the case of the known machine tool and in the case of the known method is found to be too long, since the tool-changing time enters considerably into the chip-to-chip time which is a measure of the machining speed of the machine tool. This is because the longer a tool change takes, the longer it also takes until the inserted tool is again in engagement with the workpiece. However, in particular in mass production, it is desirable to work with as short chip-to-chip times as possible.

One possibility of shortening the tool-changing time is to leave the gripper on the tool holder also during machining, i.e. to use a tool changer which moves together with the working spindle, as is the case in DE 41 17 701 A1 mentioned at the outset. However, this is not only structurally complex, this also increases the moving masses because a large number of tool changers have to be moved at the same time, with the storage capacity for tools also being restricted here.

However, even here a noticeable period of time is required until the tool holder can be ejected into the gripper and removed. Although the tool-changing time is reduced once again as a result of the fact that the tool holder is ejected into the gripper when the working spindle is still rotating at coupling speed, it nevertheless continues to be endeavored even here to further shorten the tool-changing time.

SUMMARY OF THE INVENTION

In view of the above, it is an object of the present invention to shorten, in the case of the known machine tool and the known method, the period of time required for changing a tool without impairing the operational reliability.

In the case of the method mentioned at the outset, this object is achieved in that the clamping system carries out a retaining operation which temporally precedes the clamping operation in order to preferably positively grasp the tool holder inserted into the tool-holding fixture before the clamping system fixes the tool holder, and/or carries out an unblocking operation which temporally follows the release operation in order, after the release of the clamping system, to preferably positively still retain the tool holder in the tool-holding fixture until it is ejected.

In the case of the machine tool mentioned at the outset, this object is achieved in that the clamping system additionally comprises a retaining apparatus for preferably positively holding a tool holder situated in the tool-holding fixture.

The object underlying the invention is thereby fully achieved.

By means of the two-stage procedure during the method according to the invention, the release operation of the clamping system can already begin at a high rotational speed of the working spindle, i.e. even before the gripper has again grasped the tool holder and/or before the tool holder can be ejected into the gripper, which has remained on it. During the clamping-in of a tool holder, there is the advantage that the working spindle can be accelerated up to operating speed again at an earlier time, since the tool holder comes free from the gripper and is securely retained before it is completely clamped in.

This is because the inventors of the present application have recognized that the main time factor during the changing of a tool resides in the clamping-in and release of the tool holder, and, by contrast, the ejection and the grasping of the tool holder take up significantly less time.

According to one object of the invention, the clamping and release operation is now divided in each case into two steps, for which purpose, in the novel machine tool, an additional retaining apparatus is provided in the clamping system, which apparatus grasps the tool holder at an earlier time of the insertion without already fixing it, and/or, after the release of the clamping system, initially retains it securely in the tool-holding fixture until it can be ejected.

Time can therefore be gained both during the insertion and during the removal, with it being possible also for the tool-changing time to already be shortened by the two-stage procedure being provided either during the insertion or during the removal.

The time advantage can also be realized independently of whether the gripper remains on the tool holder when the latter is clamped into the tool-holding fixture, or whether the gripper is moved away from the tool holder as soon as the latter has been grasped by the retaining apparatus, i.e. the retaining operation has been carried out.

The advantages according to the invention are also produced irrespective of whether the tool holder is removed with the working spindle stationary or with the working spindle rotating at coupling speed.

The four measures mentioned last are known per se in each case from the prior art, and by means of the novel machine tool and the novel method, a significant reduction in the tool-changing time is produced in each of these four procedures.

The release operation and/or the clamping operation can be carried out with the working spindle rotating, the release operation preferably being carried out at a higher rotational speed of the working spindle than the unblocking operation, and/or the clamping operation being carried out at a higher rotational speed of the working spindle than the retaining operation.

In other words, this means that, with the working spindle stationary or rotating at low rotational speed, a tool is inserted into the tool-holding fixture and is retained there by the retaining operation, so that it can no longer fall out of the tool-holding fixture, even if the gripper is removed from the tool holder or suitable measures are taken to enable the tool holder to come free from the gripper. The working spindle can now already be accelerated up to operating speed while at the same time the clamping operation begins, by means of which the tool holder, which is already securely retained, is now fixed in such a manner that corresponding end faces on the working spindle and the tool holder come into contact with one another in such a manner that the tool holder comes to lie in a positionally accurate manner in the tool-holding fixture, which is required for the required machining accuracy of the machine tool.

Conversely, the clamping apparatus can already carry out the release operation at a high rotational speed of the working spindle while the working spindle is braked at the same time to coupling speed or to a standstill. After the release, the tool holder is securely retained by the retaining apparatus. Only when the coupling speed or the standstill is reached does the unblocking operation take place.

Additional apparatus for securing tool holders are known per se from the prior art, but these apparatus are not actively controlled.

DE 101 59 661 C1 discloses a clamping apparatus of the kind mentioned, wherein a clamping socket is provided having radially resilient clamping sections holding a tool holder inserted into the tool-holding fixture by frictional engagement already prior to the clamping system grasping the tool holder and clamping it completely.

DE 299 22 642 U1 describes a respective clamping apparatus, wherein additionally to the clamping system radially resilient retaining tongs are provided. On the actively actuated clamping system as well as on the retaining tongs there are provided retaining shoulders that come into engagement with a bearing surface in the tool holder. The retaining shoulders of the resilient retaining tongs are lying axially farther downwards than the retaining shoulders of the clamping system, so that the retaining tongs grasp the inserted tool holder earlier than the clamping system itself.

In both cases, the tool holder is brought into engagement with the respective apparatus by spring forces, so that upon coupling with a rotating working spindle, a relative movement between the tool holder and the apparatus occurs that due to the fast tool change very quickly leads to high wear, so that according to the recognition of this applicant the known apparatus can only be used with a working spindle at standstill.

Additionally, in both cases the holding force is determined by the spring force and clamping force, respectively, so that with a tool holder only being held by the apparatus, the working spindle cannot perform quick or jerky movements, since otherwise there is the danger that the tool holder that is already being held but has not yet been clamped in is being thrown out of the working spindle.

To the contrary, according to the invention an actively controlled retaining apparatus is being used that has neither the wearing problem nor the danger that the tool holder is being thrown out of the retaining apparatus.

Thus, while the prior art discloses mere clamping apparatus, according to the invention a so to speak actively controlled retaining apparatus is being used that is being brought into engagement and out of engagement by the clamping system itself. Preferably, the retaining apparatus grasps an inserted tool holder positively, so that the tool holder is being held particularly safely.

Furthermore, according to another object it is preferable if the clamping system comprises a mandrel which, when a tool holder is being inserted, carries out a retaining stroke triggering the retaining operation and subsequently carries out a clamping stroke triggering the clamping operation, the mandrel, when a tool holder is removed, preferably carrying out a release stroke triggering the release operation and subsequently carrying out an unblocking stroke triggering the unblocking operation.

In this manner, the mandrel, by means of its axial stroke, can actuate both the clamping apparatus and the retaining apparatus, which is in particular of advantage structurally.

Clamping systems of this type with an axially moving mandrel are adequately known from the prior art and are used, in particular, for hollow shank taper tool holders; see, for example, DE 100 31 027 A1. By improvement of this clamping system, namely by provision of the additional retaining apparatus, the novel method can be implemented without changing the hollow shank taper tool holder or making other structural changes to the working spindle.

The changing of the tools also turns out to be particularly rapid because of the axial stroke of the mandrel, since the mandrel, when a tool holder is inserted, is first of all pulled back for a short distance, as a result of which the retaining operation is triggered, and then the working spindle is accelerated up and at the same time the clamping stroke is carried out. In order to remove a tool, these steps take place in the reverse direction, the mandrel ejecting the tool holder from the tool-holding fixture after or during the unblocking stroke.

In this case, it is preferred if the mandrel covers an axially longer distance during the release stroke than during the unblocking stroke and/or an axially longer distance during the clamping stroke than during the retaining stroke.

It is of advantage here that, for the clamping and accordingly release of the tool holder, a large stroke is available by means of which the tool holder can be clamped with great force into the tool-holding fixture, so that it comes to lie in a positionally correct manner with its end face against the associated end face of the working spindle.

Since the release stroke and the clamping stroke take place parallel to the braking and accelerating up of the working spindle, respectively, they do not require an additional period of time when changing the tool, and in addition to the accelerating up or braking of the working spindle, only the unblocking stroke and the retaining stroke still have to be carried out and they proceed very rapidly.

In general, according to a further object it is preferred if the clamping apparatus comprises first nipper segments which can be moved between a radially outer position, in which they engage in a hollow shank of the tool holder and fix the latter, and a radially inner position, in which they unblock the hollow shank, the retaining apparatus preferably comprising second nipper segments which can be moved between a radially outer position, in which they engage in a hollow shank of the tool holder and retain the latter in a rotationally fixed manner in the tool-holding fixture, and a radially inner position, in which they release the hollow shank. In this case, the first and second nipper segments may be formed in each case in a common segment.

Clamping systems in which a clamping apparatus is provided with first nipper segments are adequately known from the prior art. According to the invention, the retaining apparatus is now provided with the second nipper segments which serve not for fixing the tool holder, but rather merely for securely grasping the tool holder, so that it cannot fall out if the clamping apparatus is released or before the clamping apparatus is clamped. The second nipper segments may be provided as additional segments or may be formed on the first nipper segments.

In this case, it is preferred if the first and second nipper segments have first and second sliding slopes which interact with first and second mating slopes on the mandrel, the first and second sliding slopes being at a greater distance from each other in the axial direction than the first and second mating slopes.

This measure ensures that, when the extended mandrel is pulled back, first of all the second nipper segments are moved radially outwards and in the process securely grasp the tool holder, so that the gripper can release the tool holder. This takes place in a relatively short stroke, with it being ensured, by means of the different distances between the first and second mating slopes and the first and second sliding slopes, that the correct sequence of actuation of the initially second and then first nipper segments is maintained during the clamping-in operation.

In general, it is also preferred if the first and the second nipper segments have first and second retaining shoulders which lie axially approximately at the same height and are assigned to an inwardly projecting bearing surface in the hollow shank.

For the first nipper segments, this measure is known in the case of hollow shank taper tool holders; here, it is now advantageous that the second nipper segments act by means of their second retaining shoulders on the same bearing surface as the first nipper segments.

It is therefore possible, for example, to use shorter nipper segments in the clamping apparatus than in the retaining apparatus, it also being possible to form some of the nipper segments of the clamping apparatus as the retaining apparatus by their interacting according to the invention with the second mating slopes on the mandrel and not with the first mating slopes, like the first nipper segments.

Further advantages emerge from the description and the attached drawing.

It goes without saying that the features mentioned above and those which have yet to be explained below can be used not only in the respectively stated combinations, but also in other combinations or on their own without departing from the scope of the present invention.

BRIEF DESCRIPTION OF THE DRAWINGS

An embodiment of the invention is illustrated in the drawing and is explained in more detail in the description below. In the drawing.

DESCRIPTION OF A PREFERRED EMBODIMENT

Figure 1:
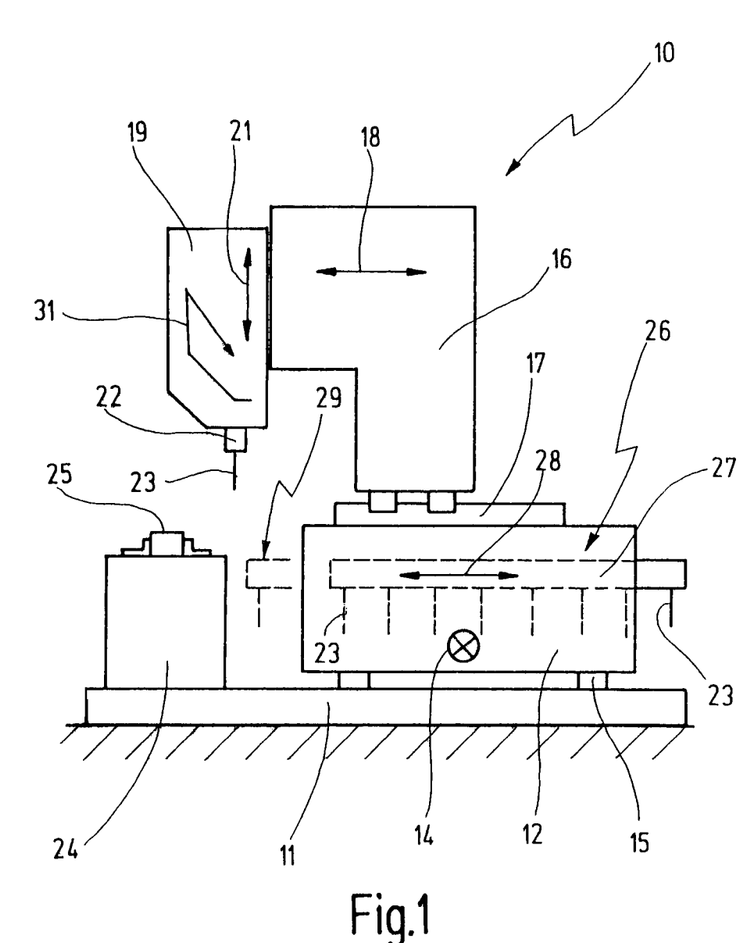
FIG. 1 shows, in a schematic side view, a schematic diagram of the novel machine tool.

In FIG. 1, 10 refers to a machine tool which is shown in a schematic illustration which is not to scale and not true to detail.

The machine tool 10 has, on its machine-tool base 11, a first slide 12 which is movable in the direction of the first axis 14 on guide rails 15. A second slide 16 is arranged on the first slide 12 in a manner such that it is movable in the direction of a second axis 18 via guide rails 17.

A spindle head 19 is mounted on the second slide 16 in a manner such that it is movable in the direction of a third axis 21. A working spindle 22 which bears a tool 23 at its lower end is mounted rotatably in the spindle head 19.

Also provided on the machine-tool base 11 is a workpiece table 24 which bears a workpiece 25 (indicated schematically) which is machined at different points by the tool 23 by moving the spindle head 19 and therefore the working spindle 18 in the three axes 14, 18, 21.

Also mounted on the first slide 12 is a machine-tool magazine 26 in the form of a chain magazine 27 which is movable in the direction of an arrow 28.

In its spindle position 29 (illustrated by dashed lines), the chain magazine 27 permits a changing of tools on the tool spindle 22.

This changing of tools can take place in the pick-up method, in which the tool spindle 22 first of all places the used tool 23 into an empty space in the chain magazine 27, and the chain magazine 27 then moves a new tool 23 into the spindle position, which tool is then picked up by the tool spindle 22.

However, in the case of the embodiment of FIG. 1, two tool changers are provided, one of which is illustrated schematically at 31 on the spindle head 19.

In order to remove a tool 23 from the working spindle 22, a tool changer is moved under the working spindle 22 which has been braked to a standstill. The tool changer 31 uses its gripper (not illustrated in FIG. 1) to grasp the tool 23 which is then ejected through the clamping system (likewise not illustrated in FIG. 1). The tool changer then moves the tool 23 into its magazine position in the chain magazine 27, the other tool changer 31 having already at the same time removed a tool 23 from the chain magazine 27 and now inserts it in a push-pull operation into the working spindle 22. After the tool has been fixed in the working spindle 22, the gripper releases the tool 23 and the working spindle 22 is accelerated up to operating speed.

It should also be mentioned that the tools 23 are not directly grasped by the tool holder 31, but rather that the tools 23 are clamped in a manner known per se into a tool holder, for which a standardized tool-holding fixture is provided at the front on the working spindle 22, and which can be grasped in a manner known per se by grippers which are provided on the tool changers 31.

Figure 2:
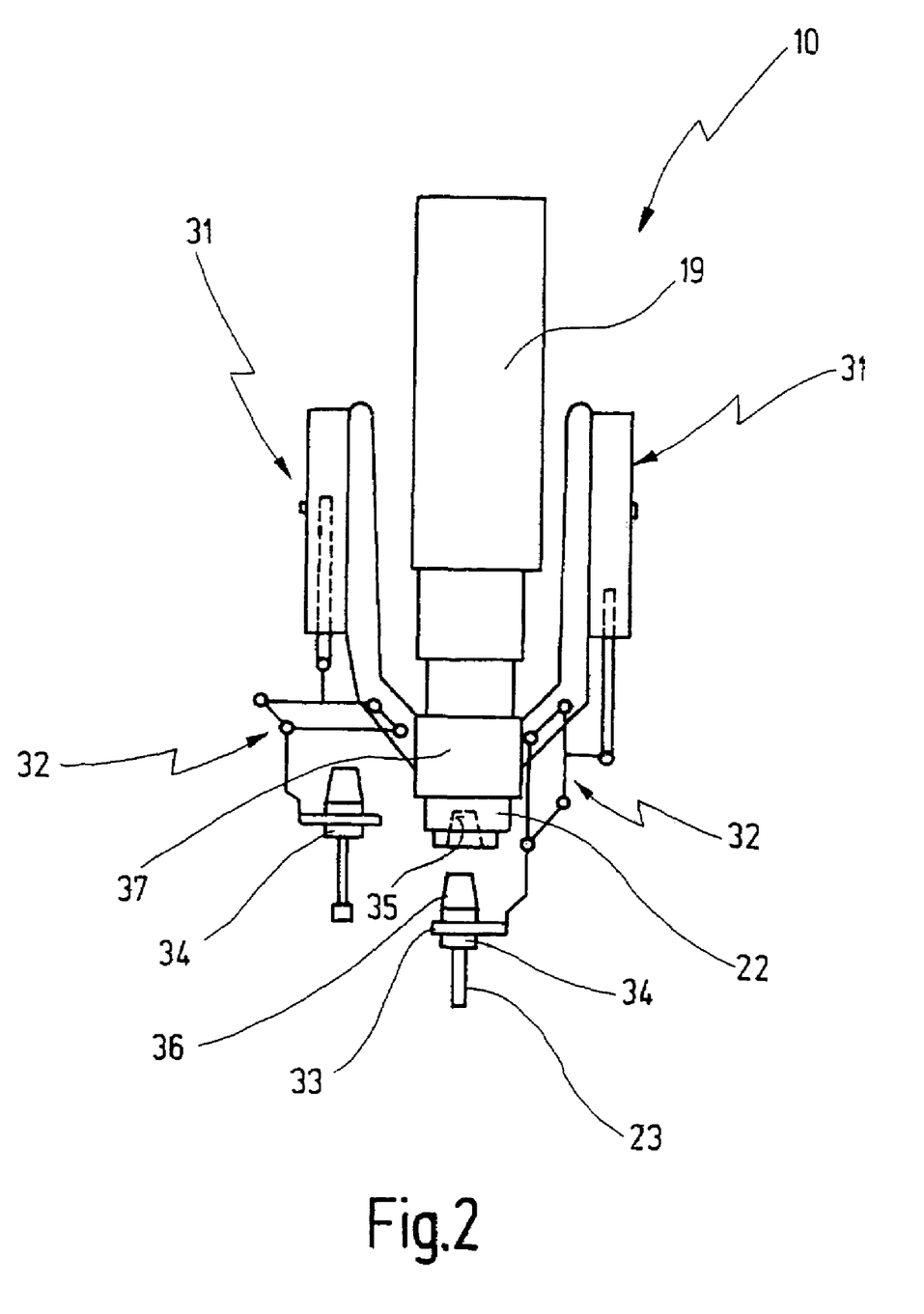
FIG. 2 shows, in a schematic front view, a schematic diagram of the novel machine tool in a different embodiment.

In this respect, this construction is comparable to the alternative embodiment of the novel machine tool that is now described in conjunction with FIG. 2.

In the case of the machine tool shown in FIG. 2, identical components are designated with the same reference numbers as in FIG. 1. The machine tool 10 has a plurality of tool changers 31 which are distributed around the spindle head 19 and of which only two are illustrated in FIG. 2. Each tool changer 31 comprises a parallelogram guide 32 at the lower end of which a respective gripper 33 is arranged which bears a tool 23 which is clamped into a tool holder 34 (illustrated schematically).

At its lower end, the working spindle has a tool-holding fixture 35 which is designed as an internal taper and into which the tool holder 34 with its geometrically matching hollow taper 36 can be inserted. For this purpose, a sleeve (indicated at 37) which bears the individual tool changers 31 is moved upwards in FIG. 2.

Whereas, in the case of the machine tool from FIG. 1, the working spindle 22 is braked in each case to a standstill before a gripper can grasp the tool holder, so that the clamping system can eject the tool holder, in the case of the machine tool from FIG. 2, the grippers 33 remain both in the magazine position, which is spaced apart from the tool-holding fixture 35, and in the working position on the tool holder 34. After the hollow taper 36 is clamped into the tool-holding fixture 35, the sleeve 37 is lowered a small distance, as a result of which the tool holder 34 comes free from the gripper 33 and can rotate freely in relation thereto.

Since, in the case of the machine tool from FIG. 2, the grippers 33 remain permanently on the tool holders 34, the tool holders 34 can be inserted and removed with the working spindle 22 still rotating at coupling speed, which affords an advantage in terms of time during the changing of tools.

Both machine tools described to this extent are adequately known from the prior art.

In the case of both machine tools, use is now made of a clamping system which is provided according to the invention and with which the method according to the invention for changing tools can be carried out.

This is now explained with reference to FIGS. 3 to 6 which show the working spindle 22 in the region of the tool-holding fixture 35 in a schematic sectional illustration, with a respective tool holder 34 having already been inserted with its hollow taper 36 into the tool-holding fixture 35.

A clamping system 41 (indicated schematically) is provided in the working spindle 22 and comprises a clamping apparatus 42, which is known per se, and a retaining apparatus 43, which is provided according to the invention. Both the clamping apparatus 42 and the retaining apparatus 43 are actuated by a mandrel 44 which, for this purpose, can execute an axial stroke, which is indicated by a double arrow 45.

The clamping apparatus 42 comprises, in a manner known per se, first nipper segments 46 which are distributed circumferentially around the mandrel 44 and of which in each case one nipper segment is illustrated on the right in FIGS. 3 to 6. In a comparable manner, the retaining apparatus 43 comprises second nipper segments 47 which are distributed circumferentially around the mandrel 44 and of which one nipper segment is illustrated on the left of the mandrel 44 in FIGS. 3 to 6. The nipper segments 46 and 47 may be arranged in an alternating manner in the circumferential direction, with it being possible for the number of second nipper segments 47 to be smaller than the number of first nipper segments 46.

Figure 3:
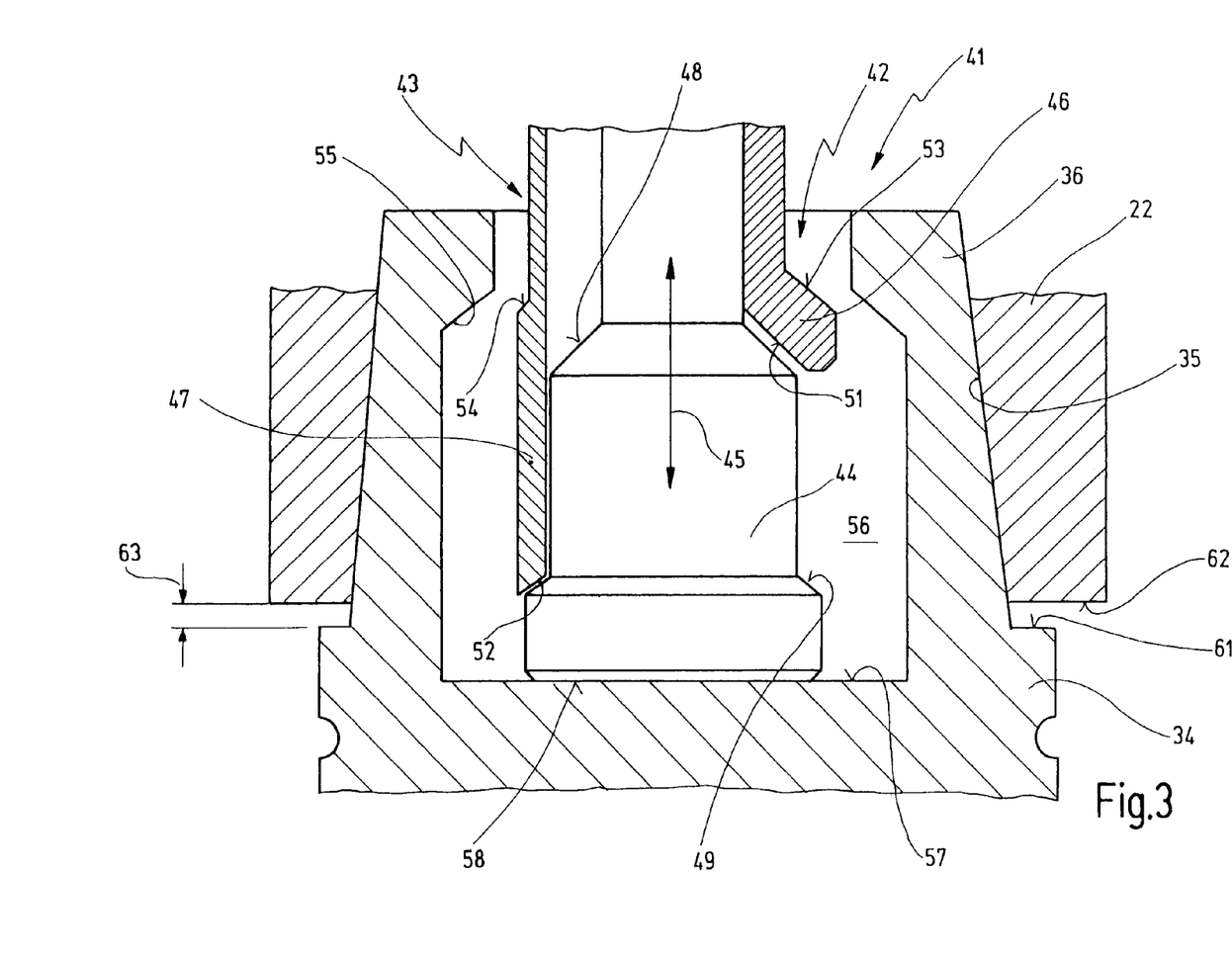
FIG. 3 shows, in a schematic, partially cut away illustration, the working spindle of the machine tool from FIG. 1 or FIG. 2 in the region of the tool-holding fixture, with the tool holder inserted, but before the beginning of the retaining operation.
Figure 4:
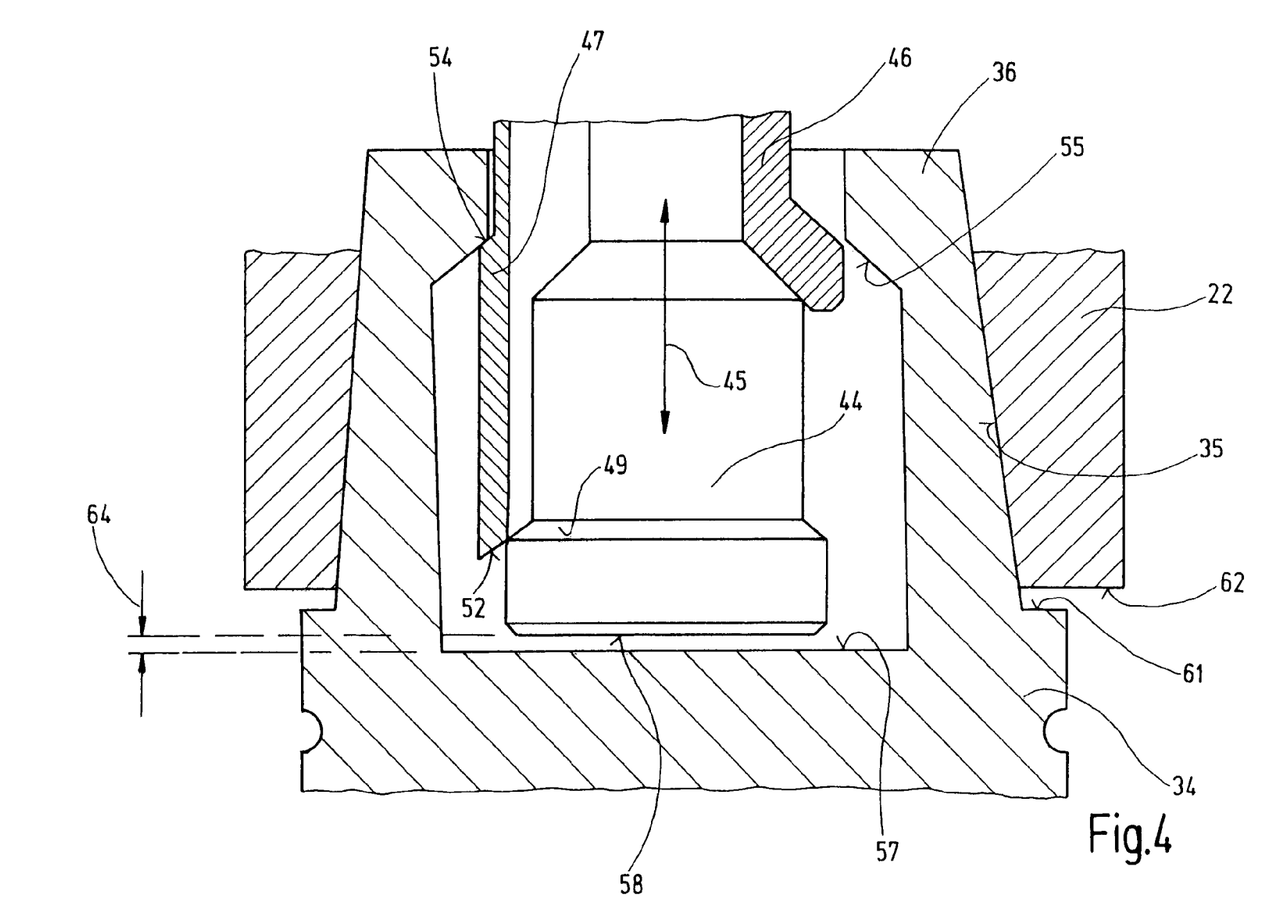
FIG. 4 shows an illustration as per FIG. 3, in which, however, the retaining operation has been carried out.
Figure 5:
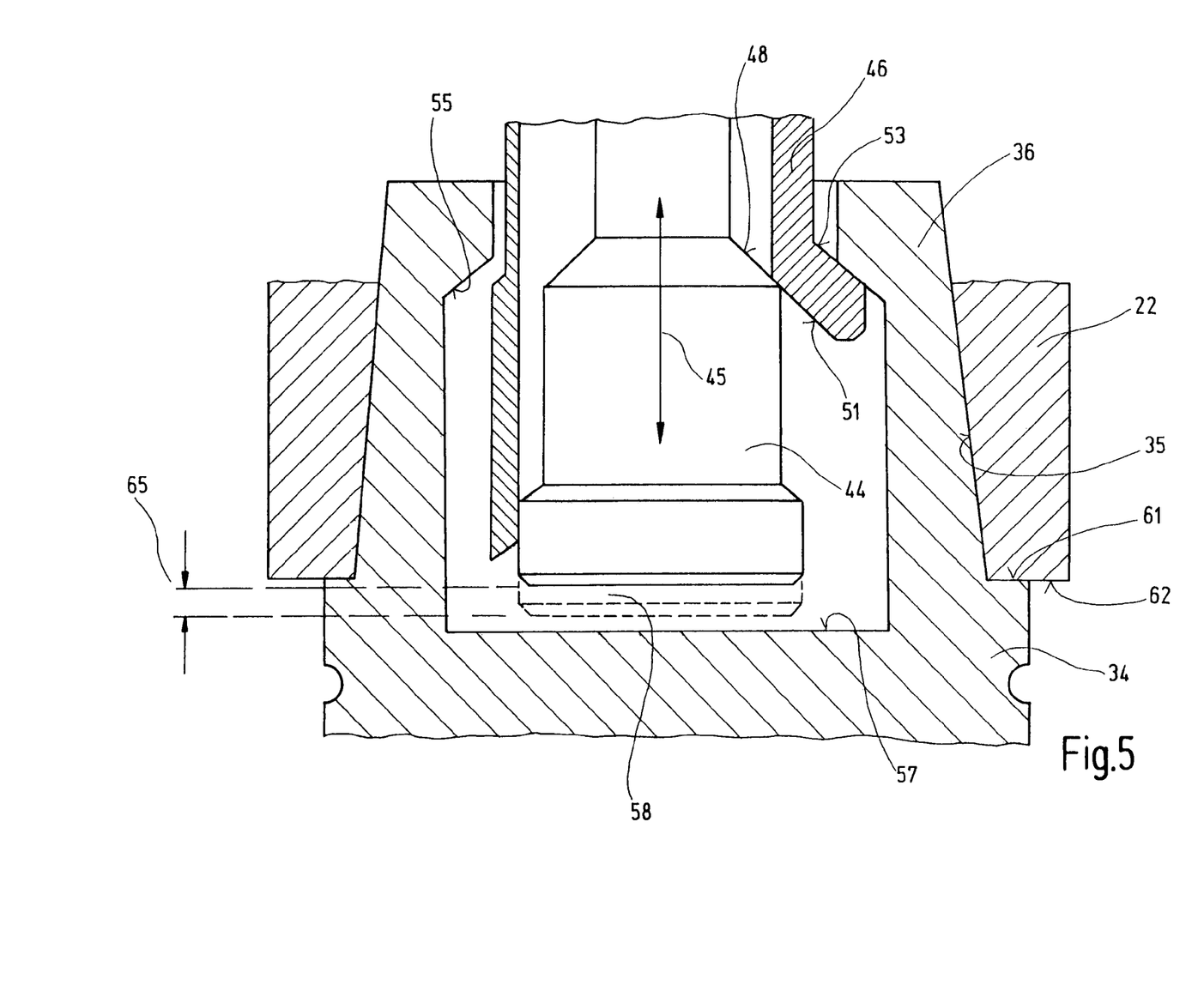
FIG. 5 shows an illustration as per FIG. 4, in which, however, the clamping operation has been carried out.
Figure 6:
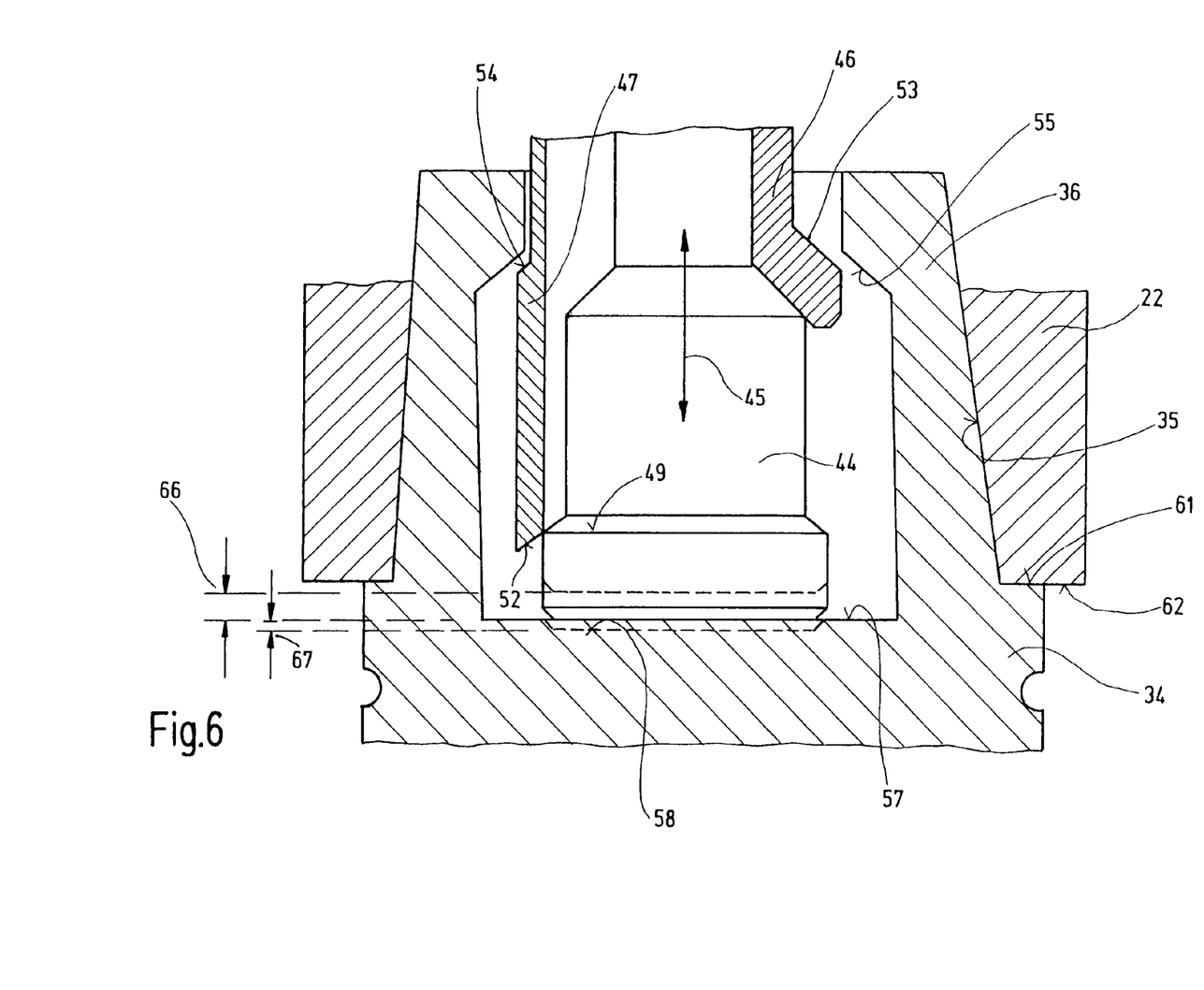
FIG. 6 shows an illustration as per FIG. 4, in which, however, the release operation has been carried out.

Both the first nipper segments 46 and the second nipper segments 47 interact with the mandrel 44 in such a manner that they can be moved by the axial stroke 45 from their radially inner position, which is shown in FIG. 3 and in which they completely release the hollow shank 46, into their radially outer position, which is shown in FIGS. 4 to 6 and will be explained in more detail.

For this purpose, an upper tapered surface 48 and a lower tapered surface 49 are provided on the mandrel 44 and serve as first and second mating slopes for first sliding slopes 51 on the first nipper segments 46 and second sliding slopes 52 on the second nipper segments 47. In the axial direction, the distance between the tapered surfaces
smaller than the distance between the sliding slopes 51, 52, so that when the mandrel 44 is pulled upwards, first of all the nipper segments 47 and then the nipper segments 46 are moved radially outwards.

Away from the first and second sliding slopes 51, 52, first retaining shoulders 53 are provided on the first nipper segments 46 and second retaining shoulders 54 are provided on the second nipper segments 47, which retaining shoulders interact with an inwardly projecting bearing surface 55, which runs circumferentially, in the hollow shank 36 when the nipper segments 46 and/or 47 are moved radially outwards. The retaining shoulders 53 and 54 lie axially approximately at the same height.

In the operating state shown in FIG. 3, the hollow shank 36 has been introduced into the tool-holding fixture 35 until the mandrel 44 engages in a cavity 56 which is provided in the hollow shank 36. The cavity 56 has a cavity base 57 with which the mandrel 44 is in contact by means of its end surface 58 in FIG. 3.

In the operating position which is shown in FIG. 3 and in which neither the clamping apparatus 42 nor the retaining apparatus 43 have carried out their clamping operation or retaining operation, i.e. the nipper segments 46 and 47 still lie radially on the inside, the tool holder with its annular shoulder 61 is at a small distance, which is indicated at 63, from a mating surface 62 provided on the end side of the working spindle 22. This distance is, for example, 0.5 mm.

In the operating position shown in FIG. 3, the working spindle 22 can be at a standstill or can rotate with a small coupling speed. The mandrel 44 now executes a retaining stroke upwards in the direction of the arrow 45, in which stroke the end surface mandrel 44 lifts off from the cavity base 57 by a distance indicated at 64. By means of this retaining stroke 64, the second sliding slope 52 slides outwards on the second tapered surface 49, so that the second nipper segments 47 tilt and come with their second retaining shoulder 54 into contact with the bearing surface 55. By means of the small retaining stroke 64, the tool holder 34 is now retained securely in the working spindle 22, so that it can no longer fall out of the tool-holding fixture 35. However, the annular shoulder 61 and the mating surface 62 are still at the distance 63, which is shown in FIG. 3, from each other. The state after the retaining stroke 64 is shown in FIG. 4. In this state, for example, the gripper, in the case of the machine tool from FIG. 1, can move away from the tool holder while, in the case of the machine tool from FIG. 2, the gripper 33 can be lowered, by moving the sleeve 37, until the tool holder 34 is no longer carried by the gripper 33, i.e. can move freely in relation thereto.

When the state of FIG. 4 is reached, the working spindle 22 can consequently be accelerated up to its operating speed without there being the risk of the tool holder 34 falling out of the tool-holding fixture 35 again, since it is securely held by the second nipper segment.

While the working spindle 22 is being accelerated up, the mandrel 44 executes a clamping stroke, which is shown in FIG. 5 at 65, upwards in the direction of the arrow 45. In a comparison with FIG. 4, it can be seen that the mandrel 44 covers an axially greater distance in the clamping stroke 65 than in the retaining stroke 64.

The clamping stroke 65 causes the first nipper segments to slide outwards with their first sliding slope 51 on the first tapered surface 48, so that they come into contact by means of their first retaining shoulder 53 with the bearing surface 55. In this case, the hollow taper 36 is pulled into the tool-holding fixture 35 until the annular shoulder 61 comes into contact with the mating surface 62. The tool holder 34 is now fixed securely in the tool-holding fixture 35, the plane contact between annular shoulder 61 and mating surface 62 ensuring that the tool holder 34 is precisely positioned in the working spindle 22, so that highly precise machinings of workpieces can be carried out with the tool carried by the tool holder 34.

When the use of the inserted tool is at an end, the working spindle 22 is braked to a standstill or down to coupling speed. As soon as the tool has come free from the workpiece, a release stroke 66 is carried out at the same time by the mandrel 44 and reverses the effect of the clamping stroke 65. This state is shown in FIG. 6. Owing to the fact that the mandrel 44 has moved downwards by the release stroke 66 in the direction of the arrow 45 in FIG. 6, the first nipper segments 46 come free with their first retaining shoulders 53 from the bearing surface 55 while the second nipper segments 47 are still situated with their second retaining shoulder 54 below the bearing surface 55, so that the tool holder 34 cannot fall out of the tool-holding fixture 35.

It can be seen in FIG. 6 that the annular shoulder 61 is still in contact with the mating surface 62 although the mandrel 44 has already carried out the release stroke 66 and rests again with its end surface cavity base 57. This is because the clamping stroke 65 has caused the hollow shank 36 to be pulled into the tool-holding fixture 35 under such a stress that it even remains clamped there when the first nipper segments 46 again release the hollow taper 36. As a rule, the tool holder 34 does not even fall out of the tool-holding fixture 35 when the working spindle 62 is braked from operating speed to coupling speed or to a standstill; however, such an undefined falling of the tool holder 34 out of the tool-holding fixture 35 cannot be entirely prevented, for which reason the invention provides the second nipper segments 47. Should the tool holder 34 in FIG. 6 fall out of the tool-holding fixture 35, it is caught by the second retaining shoulders 54 of the second nipper segments 47.

When the working spindle 22 has been braked to coupling speed or to a standstill, the mandrel 44 then carries out its release stroke which is indicated in FIG. 6 at 67. The mandrel then moves further downwards in FIG. 6, as a result of which the second nipper segments again take up their radially inner position, which is shown in FIG. 3. The mandrel 44 presses here with its end surface 58 onto the cavity base 57 and, as a result, ejects the tool holder 34 into the gripper which has again been moved to the tool holder or has remained thereon.

As an alternative, it is also possible to form the first and the second nipper segments 46, 47 in each case in a common segment, with the result that, for example, six segments are provided in a circumferentially distributed manner, on which in each case both the first and second sliding slopes 51 and 52 and the first and second retaining shoulders 53 and 54 are formed.

Therefore, what is claimed, is:

1. A machine tool which comprises at least one working spindle with a tool-holding fixture for tool holders carrying tools, and a tool changer with a gripper for the tool holder in order to transfer the tool holder between a magazine position, which is spaced apart from the tool-holding fixture, and a working position in the tool-holding fixture, there being provided in the working spindle a clamping system with a clamping apparatus by means of which a tool holder inserted into the tool-holding fixture is fixed, wherein the clamping system additionally comprises a retaining apparatus for positively holding a tool holder situated in the tool-holding fixture, wherein the clamping system comprises a mandrel, which, by means of a stroke in the direction of a rotational axis of the at least one spindle, actuates both the clamping apparatus and the retaining apparatus, and wherein the retaining apparatus is configured so as to be able to provide the positive holding of the tool holder when actuated by the mandrel before the mandrel actuates the fixing of the tool holder by the clamping apparatus.

2. The machine tool of claim 1, wherein the mandrel has tapered surfaces that actuate both the clamping apparatus and the retaining apparatus.

3. The machine tool of claim 2, wherein the clamping apparatus comprises first nipper segments which can be moved between a radially outer position, in which they engage in a hollow shank of the tool holder and fix the latter, and a radially inner position, in which they release the hollow shank.

4. The machine tool of claim 3, wherein the retaining apparatus comprises second nipper segments which can be moved between a radially outer position, in which they engage in a hollow shank of the tool holder and retain the latter in a rotationally fixed manner in the tool-holding fixture, and a radially inner position, in which they release the hollow shank.

5. The machine tool of claim 1, wherein the clamping apparatus comprises first nipper segments which can be moved between a radially outer position, in which they engage in a hollow shank of the tool holder and fix the latter, and a radially inner position, in which they release the hollow shank.

6. The machine tool of claim 5, wherein the retaining apparatus comprises second nipper segments which can be moved between a radially outer position, in which they engage in a hollow shank of the tool holder and retain the latter in a rotationally fixed manner in the tool-holding fixture, and a radially inner position, in which they release the hollow shank.

7. The machine tool of claim 5, wherein the retaining apparatus comprises second nipper segments, and wherein the first and second nipper segments have first and second sliding slopes which interact with first and second mating slopes on the mandrel, the first and second sliding slopes being at a greater distance from each other in the axial direction than the first and second mating slopes.

8. The machine tool of claim 7, wherein the first and the second nipper segments have first and second retaining shoulders which lie axially approximately at the same height and are assigned to an inwardly projecting bearing surface in the hollow shank.

9. The machine tool of claim 5, wherein the retaining apparatus comprises second nipper segments, and wherein the first and second nipper segments have ends that are axially spaced.

10. The machine tool of claim 1, wherein the retaining apparatus comprises retaining nipper segments which can be moved between a radially outer position, in which they engage in a hollow shank of the tool holder and retain the latter in a rotationally fixed manner in the tool-holding fixture, and a radially inner position, in which they release the hollow shank.

11. A machine tool which comprises at least one working spindle with a tool-holding fixture for tool holders carrying tools, and a tool changer with a gripper for the tool holder in order to transfer the tool holder between a magazine position, which is spaced apart from the tool-holding fixture, and a working position in the tool-holding fixture, there being provided in the working spindle a clamping system with a clamping apparatus by means of which a tool holder inserted into the tool-holding fixture is fixed, wherein the clamping system additionally comprises a retaining apparatus for positively holding a tool holder situated in the tool-holding fixture, and wherein the clamping system comprises a mandrel which, by means of a stroke in the direction of a rotational axis of the at least one spindle, actuates both the clamping apparatus and the retaining apparatus, and wherein axially-spaced tapered surfaces of the mandrel engage mating axially-spaced slopes of the clamping apparatus and of the retaining apparatus, respectively, in order to actuate the retaining apparatus separately from the clamping apparatus.

12. A machine tool which comprises at least one working spindle with a tool-holding fixture for tool holders carrying tools, and a tool changer with a gripper for the tool holder in order to transfer the tool holder between a magazine position, which is spaced apart from the tool-holding fixture, and a working position in the tool-holding fixture, there being provided in the working spindle a clamping system with a clamping apparatus by means of which a tool holder inserted into the tool-holding fixture is fixed, wherein the clamping system additionally comprises a retaining apparatus for positively holding a tool holder situated in the tool-holding fixture, and wherein the clamping system comprises a mandrel which, by means of a stroke in the direction of a rotational axis of the at least one spindle, actuates both the clamping apparatus and the retaining apparatus, and wherein the clamping apparatus comprises first nipper segments which can be moved between a radially outer position, in which they engage in a hollow shank of the tool holder and fix the latter, and a radially inner position, in which they release the hollow shank, wherein the retaining apparatus comprises second nipper segments which can be moved between a radially outer position, in which they engage in the hollow shank of the tool holder and retain the latter in a rotationally fixed manner in the tool-holding structure, and a radially inner position, in which they release the hollow shank, and wherein the second nipper segments are configured to be actuated by the mandrel to perform the retaining of the tool holder before the first nipper segments are actuated by the mandrel to perform the fixing of the tool holder.

* * * * *

UNITED STATES PATENT AND TRADEMARK OFFICE
CERTIFICATE OF CORRECTION

PATENT NO. : 7,347,807 B2  
APPLICATION NO. : 11/639183  
DATED : March 25, 2008  
INVENTOR(S) : Dirk Prust et al.

It is certified that error appears in the above-identified patent and that said Letters Patent is hereby corrected as shown below:

Title Page,
Page 2, Item (56) References Cited, FOREIGN PATENT DOCUMENTS, second column, line 3,
"104 55 333 A1" should be -- 101 55 333 A1 --.

Signed and Sealed this

Ninth Day of September, 2008

JON W. DUDAS  
*Director of the United States Patent and Trademark Office*